US012227055B2

(12) United States Patent
Jeong et al.

(10) Patent No.: US 12,227,055 B2
(45) Date of Patent: Feb. 18, 2025

(54) HEAT PUMP SYSTEM FOR VEHICLE

(71) Applicants: Hyundai Motor Company, Seoul (KR); Kia Corporation, Seoul (KR)

(72) Inventors: Seong-Bin Jeong, Hwaseong-Si (KR); Dong Seok Oh, Hwaseong-Si (KR); Wan Je Cho, Hwaseong-Si (KR); Jae Yeon Kim, Hwaseong-Si (KR); Namho Park, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 231 days.

(21) Appl. No.: 17/879,122

(22) Filed: Aug. 2, 2022

(65) Prior Publication Data

US 2023/0173872 A1   Jun. 8, 2023

(30) Foreign Application Priority Data

Dec. 6, 2021  (KR) .................. 10-2021-0173119

(51) Int. Cl.
   *B60H 1/00*        (2006.01)
(52) U.S. Cl.
   CPC ..... *B60H 1/00278* (2013.01); *B60H 1/00885* (2013.01)
(58) Field of Classification Search
   CPC ............ B60H 1/00278; B60H 1/00885; B60H 1/00485; B60H 1/00899; B60H 1/32284; B60H 2001/00307; B60H 1/00007; B60H 1/3213; B60H 1/00385; B60H 1/143; B60H 1/323
   See application file for complete search history.

(56) References Cited

U.S. PATENT DOCUMENTS

2022/0032736 A1 *  2/2022  Kim .................. B60H 1/3205

FOREIGN PATENT DOCUMENTS

| CN | 109895591 A | * | 6/2019 | ......... B60H 1/00278 |
| CN | 112172444 A | * | 1/2021 | ......... B60H 1/00278 |
| CN | 113135081 A | * | 7/2021 | ......... B60H 1/00271 |
| KR | 20210027675 A | * | 3/2021 | |
| KR | 20210047733 A | * | 4/2021 | |
| KR | 10-2021-0061520 A |   | 5/2021 | |
| KR | 20210058462 A | * | 5/2021 | |
| KR | 20210061520 A | * | 5/2021 | |
| KR | 20210070065 A | * | 6/2021 | |
| WO | WO-2021052445 A1 | * | 3/2021 | ......... B60H 1/00278 |

* cited by examiner

*Primary Examiner* — Kun Kai Ma
(74) *Attorney, Agent, or Firm* — Morgan, Lewis & Bockius LLP (57) ABSTRACT

A heat pump system for a vehicle includes a valve, an electrical component cooling apparatus, a battery cooling apparatus, an internal heating apparatus, an internal cooling device, a centralized energy device, and a chiller for controlling a temperature of a battery module by use of a chiller in which a coolant and a refrigerant are heat-exchanged, and for recovering and using heat from various heat sources in a heating mode of a vehicle for indoor heating to improve heating efficiency, wherein the battery coolant line is selectively connectable to the first connection line through a battery coolant connection line connecting the battery coolant line and the first connection line.

14 Claims, 4 Drawing Sheets

HEAT PUMP SYSTEM FOR VEHICLE

CROSS-REFERENCE TO RELATED APPLICATION

The present application claims priority to Korean Patent Application No. 10-2021-0173119 filed on Dec. 6, 2021, the entire contents of which is incorporated herein for all purposes by this reference.

BACKGROUND OF THE PRESENT DISCLOSURE

Field of the Present Disclosure

The present disclosure relates to a heat pump system for vehicle. More particularly, the present disclosure relates to a heat pump system for a vehicle selectively using a chiller in which a refrigerant and a coolant are heat-exchanged to adjust a temperature of a battery module and selectively using a coolant of a high temperature and a coolant of a low temperature for cooling or heating an interior of a vehicle.

Description of Related Art

Generally, an air condition system for a vehicle includes an air conditioning device circulating a refrigerant to heat or cool an interior of the vehicle.

The air conditioning device, which is to maintain the interior of the vehicle at an appropriate temperature regardless of a change in an external temperature to maintain a comfortable internal environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioning device lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Recently, as interest in energy efficiency and an environmental contamination problem are increased day by day, there is a demand for developing an environmentally friendly vehicle which is capable of substantially replacing an internal combustion engine vehicle, and the environmentally friendly vehicle is commonly divided into an electric vehicle which is driven by use of a fuel cell or electricity as a power source and a hybrid vehicle which is driven by use of an engine and an electric battery.

In the electric vehicle or the hybrid vehicle among these environmentally friendly vehicles, a separate heater is not used, unlike an air conditioner of a general vehicle, and an air conditioner used in the environmentally friendly vehicle is generally known as a heat pump system.

Meanwhile, the electric vehicle generates driving force by converting chemical reaction energy between oxygen and hydrogen into electrical energy. In the present process, thermal energy is generated by a chemical reaction in a fuel cell. Therefore, it is necessary in securing performance of the fuel cell to effectively remove generated heat.

Furthermore, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed to secure performance of the motor.

Therefore, in the hybrid vehicle or the electric vehicle according to the related art, a cooling apparatus and a battery cooling apparatus should be configured using separate closed circuits, respectively, to prevent heat generation in the motor, an electrical component, and the battery including the fuel cells along with the heat pump system.

Therefore, there are drawbacks that the size and weight of the cooling module provided in front of the vehicle increases, and the layout of the connecting pipes that supply the refrigerator or coolant to the heat pump system, the cooling apparatus, and the battery cooling apparatus in a narrow space becomes complicated.

Furthermore, because the battery cooling system heating or cooling the battery depending on a state of the vehicle is separately provided so that the battery exhibits optimal performance, a plurality of valves for connecting the respective connection pipes to each other are used, and noise and vibration due to frequent opening or closing operation of these valves are transferred to the interior of the vehicle so that ride comfort deteriorates.

Furthermore, when heating the vehicle interior, there are drawbacks that the heating performance deteriorates due to the lack of a heat source, the electricity consumption is increased by the use of the electric heater, and the power consumption of the compressor is increased.

The information included in this Background of the present disclosure is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing a heat pump system for a vehicle for controlling a temperature of a battery module by use of a chiller in which a coolant and a refrigerant are heat-exchanged, and for recovering and using heat from various heat sources in a heating mode of a vehicle for indoor heating to improve heating efficiency.

A heat pump system for a vehicle according to an exemplary embodiment of the present disclosure may include a valve that is configured to control a flow of coolant inflowed inside; an electrical component cooling apparatus including a coolant line connected to the valve, and a radiator and a first pump provided in the coolant line and configured for circulating a coolant in the coolant line to cool at least one electrical component provided in the coolant line; a battery cooling apparatus including a battery coolant line connected to the valve, and a second pump and a battery module provided in the battery coolant line and configured for circulating a coolant to the battery module; an internal heating apparatus including a first connection line connected to the valve to heat the vehicle interior by use of high-temperature coolant, and a third pump and a heater provided in the first connection line; an internal cooling device including a fourth pump and a cooler interconnected through a second connection line to cool a vehicle interior by use of a low-temperature coolant; a centralized energy (CE) device connected to the internal heating apparatus through the valve to supply a coolant of a high temperature to the internal heating apparatus and supply a coolant of a low temperature to the internal cooling device, connected to the second connection line, and configured for controlling a temperature of the coolant by heat-exchanging thermal energy generated during condensation and evaporation of refrigerant circulating in a refrigerant line with the coolant inflowed by operation of the valve; and a chiller connected to the centralized energy device through a refrigerant connection line so that the refrigerant is selectively circulated, connected to the valve through a chiller connection line, and heat-exchanging the selectively inflowed coolant with the refrigerant to control the temperature of the coolant, wherein the battery coolant line is selectively connectable to the first connection line through a battery coolant connection line connecting the battery coolant line and the first connection line.

The valve may include: a first port connected to the coolant line connected to the at least one electrical component; a second port connected to a first end portion of the condenser connection line to supply a coolant to the condenser provided in the centralized energy device; a third port to which a first end portion of the first connection line is connected; a fourth port to which a first end portion of the battery coolant line is connected; a fifth port to which a first end portion of the chiller connection line is connected to supply a coolant to the chiller; and a sixth port to which a second end portion of the chiller connection line is connected so that a coolant exhausted from the chiller flows in.

The valve may include: a seventh port to which a second end portion of the battery coolant line is connected; an eighth port to which the coolant line connected to the radiator is connected; a ninth port to which a bypass line connected to the radiator is connected; a tenth port to which a second end portion of the condenser connection line is connected so that the coolant that has passed through the condenser inflows to the valve; an eleventh port to which a radiator connection line connecting the valve and the radiator is connected separately from the coolant line and the bypass line; and a twelfth port to which the first connection line connected to the third pump is connected.

When cooling the battery module in a cooling mode of the vehicle, the coolant may be circulated in the coolant line by operation of the first pump in the electrical component cooling apparatus, the coolant flowing along the coolant line may inflow to the first port and then is discharged to the condenser connection line through the second port to be supplied to the condenser, the coolant that has passed through the condenser may inflow to the valve through the tenth port and then inflow to the radiator through the radiator connection line connected to the eleventh port, the coolant may be circulated in the battery coolant line by operation of the second pump in the battery cooling apparatus, the coolant inflowed from the valve to the battery coolant line connected to the seventh port may pass through the battery module and then inflow to the valve through the fourth port, the coolant inflowed from the valve to the chiller connection line connected to the fifth port may pass through the chiller, then may inflow to the valve along the chiller connection line connected to the sixth port, and again be circulated along the battery coolant line and the chiller connection line while being discharged to the seventh port, each constituent element may operate so that refrigerant may circulate along the refrigerant line in the centralized energy device, and the fourth pump may be operated so that coolant may be circuited along the second connection line that connects an evaporator and the cooler to supply the coolant passing through the evaporator provided in the centralized energy device to the cooler in the internal cooling device.

When recovering heat from an external heat source in a heating mode of the vehicle and increasing the temperature of the battery module, the first and second water pumps may be operated, respectively, in the electrical component cooling apparatus and the battery cooling apparatus, the third pump may be operated in the internal heating apparatus, the coolant flowing along the coolant line may flow into the first port and then be discharged from the valve through the fifth port to the chiller connection line, the coolant discharged to the chiller connection line may pass through the chiller along the chiller connection line and then flow into the valve through the sixth port, the coolant inflowed to the valve may be discharged to the coolant line connected to the radiator through the eighth port and recover heat from the external heat source from outside air while passing through the radiator, the coolant exhausted from the valve through the second port may be supplied to the condenser along the condenser connection line, the coolant that has passed through the condenser may inflow to the valve through the tenth port and then be supplied to the heater along the first connection line connected to the twelfth port, the coolant that has passed through the heater may inflow to the valve through the third port connected to the first connection line, some of the coolant inflowed to the first connection line connected to the twelfth port may flow to the battery coolant line along the battery coolant connection line, circulate through the battery module, and then inflow to the valve through the fourth port, and each constituent element may operate so that refrigerant may circulate along the refrigerant line in the centralized energy device.

When recovering the waste heat of at least one electrical component in the heating mode of the vehicle and increasing the temperature of the battery module, the first and second water pumps may be operated, respectively, in the electrical component cooling apparatus and the battery cooling apparatus, the third pump may be operated in the internal heating apparatus, the coolant flowing along the coolant line may flow into the first port and then be discharged from the valve through the fifth port to the chiller connection line, the coolant discharged to the chiller connection line may pass through the chiller along the chiller connection line and then flow into the valve through the sixth port, the coolant inflowed to the valve may be discharged to the bypass line through the ninth port, the coolant inflowed to the bypass line may pass through at least one electrical component along the coolant line and the temperature may rise by the waste heat of at least one electrical component, the coolant exhausted from the valve through the second port may be supplied to the condenser along the condenser connection line, the coolant that has passed through the condenser may inflow to the valve through the tenth port and then be supplied to the heater along the first connection line connected to the twelfth port, the coolant that has passed through the heater may inflow to the valve through the third port connected to the first connection line, some of the coolant inflowed to the first connection line connected to the twelfth port may flow to the battery coolant line along the battery coolant connection line, circulate through the battery module, and then inflow to the valve through the fourth port, and each constituent element may operate so that refrigerant may circulate along the refrigerant line in the centralized energy device.

The chiller may increase the temperature of the refrigerant by heat-exchanging the coolant and the refrigerant to recover waste heat from coolant whose temperature has risen while passing through at least one electrical component.

The centralized energy device may include: a condenser that condenses the refrigerant through heat-exchange of the refrigerant and the coolant; a first expansion valve connected to the condenser through the refrigerant line; an evaporator connected to the first expansion valve through the refrigerant line, connected to the second connection line, and evaporating the refrigerant through heat-exchange of the refrigerant and the coolant simultaneously and decreasing a temperature of the coolant; a compressor provided on the refrigerant line between the evaporator and the condenser; and an accumulator provided on the refrigerant line between the evaporator and the compressor, a first end portion of the refrigerant connection line may be connected to the refrigerant line between the condenser and the first expansion valve, and a second end portion of the refrigerant connection line may be connected to the refrigerant line between the evaporator and the accumulator.

A second expansion valve may be provided to control the flow of the refrigerant inflowing into the chiller and to selectively expand the refrigerant on the refrigerant connection line at front of the chiller.

The second expansion valve may expand the refrigerant inflowed into the refrigerant connection line to inflow into the chiller when cooling the battery module by use of the coolant heat-exchanged with the refrigerant, or selectively recovering waste heat from at least one electrical component and the battery module.

The first expansion valve and the second expansion valve may be electronic expansion valves that selectively expand the refrigerant while controlling the flow of the refrigerant.

The chiller may recover waste heat generated from at least one electrical component or the battery module, or adjust the temperature of the battery module according to the cooling mode of the vehicle or the heating mode.

When dehumidification is required in the heating mode of the vehicle, the fourth pump provided in the internal cooling device may be operated, and the refrigerant may be supplied to the evaporator provided in the centralized energy device.

The internal heating apparatus may further include a coolant heater provided in the first connection line between the valve and the third water pump.

The coolant heater may be operated when the temperature of the coolant supplied to the heater in the heating mode of the vehicle is lower than the target temperature, or when the temperature of the battery module is increased.

As above-described, according to the heat pump system for the vehicle according to various exemplary embodiments of the present disclosure, the system may be simplified by adjusting the temperature of the battery module according to the vehicle mode by use of one chiller where the coolant and the refrigerant are heat-exchanged in the electric vehicle.

Furthermore, the present disclosure may improve heating efficiency by selectively recovering the waste heat generated from an external heat source, the electrical component, or the battery module in the heating mode of the vehicle to be used for internal heating.

Furthermore, the present disclosure implements various modes by use of one valve that is configured to control the flow of the coolant, reducing a manufacturing cost and a weight, and improving space utilization through the simplification of the entire system.

Furthermore, the present disclosure enables optimal performance of the battery module by efficiently controlling the temperature of the battery module, and the overall travel distance of the vehicle may be increased through efficient management of the battery module.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

Embodiments described in the exemplary embodiment and configurations shown in the drawings are just the most preferable embodiments of the present disclosure, and do not limit the spirit and scope of the present disclosure. Therefore, it should be understood that there may be various equivalents and modifications capable of replacing them at the time of filing of the present application.

To clarify the present disclosure, parts that are not connected with the description will be omitted, and the same elements or equivalents are referred to by the same reference numerals throughout the specification.

The size and thickness of each element are arbitrarily shown in the drawings, but the present disclosure is not necessarily limited thereto, and in the drawings, the thickness of layers, films, panels, regions, etc., are exaggerated for clarity.

Throughout the present specification and the claims which follow, unless explicitly described to the contrary, the word "comprise" or variations such as "comprises" or "comprising" will be understood to imply the inclusion of stated elements but not the exclusion of any other elements.

Furthermore, the terms " . . . unit", " . . . mechanism", " . . . portion", " . . . member", etc. used herein mean a unit of inclusive components performing at least one or more functions or operations.

Figure 1:
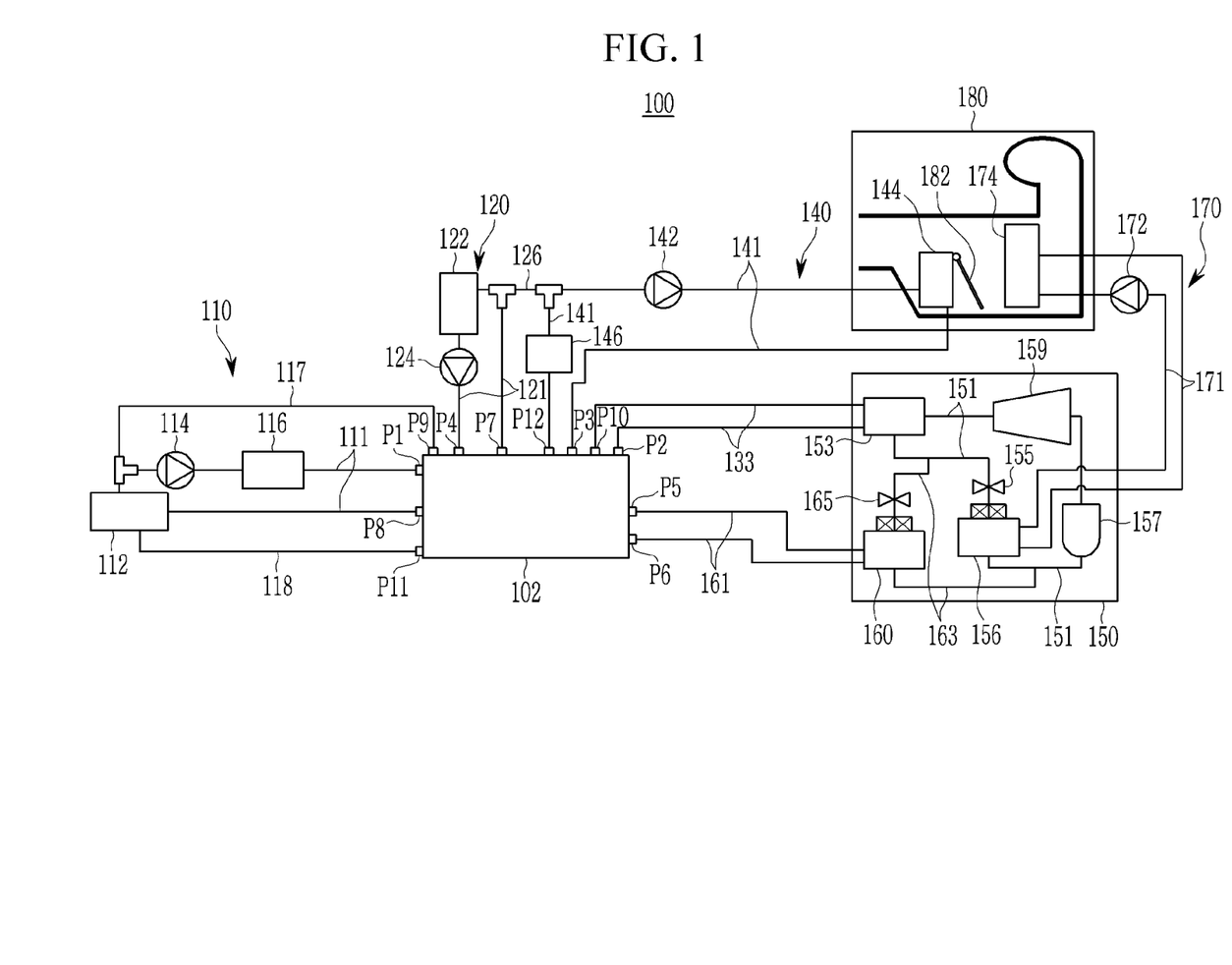
FIG. 1 is a block diagram of a heat pump system for a vehicle according to various exemplary embodiments of the present disclosure.

FIG. 1 is a block diagram of a heat pump system for a vehicle according to various exemplary embodiments of the present disclosure.

A heat pump system 100 for a vehicle according to various exemplary embodiments of the present disclosure selectively utilizes a chiller 160 in which a refrigerant and a coolant are heat-exchanged to control a temperature of a battery module 122, and selectively utilizes a coolant of a high temperature and a coolant of a low temperature to cool or heat an interior of a vehicle.

Referring to FIG. 1, the heat pump system 100 according to various exemplary embodiments of the present disclosure includes a valve 102, an electrical component cooling apparatus 110, a battery cooling apparatus 120, an internal heating apparatus 140, an internal cooling device 170, a centralized energy device (hereinafter, referred to as a CE device) 150, and a chiller 160.

First, the valve 102 may control the flow of the coolant inflowed inside. The valve may be operated according to a control signal of a non-illustrated controller.

In an exemplary embodiment of the present disclosure, the electrical component cooling apparatus 110 includes a coolant line 111 connected to the valve 102, and a radiator 112 and a first water pump 114 provided in the coolant line 111.

The radiator 112 is provided at the front of the vehicle, and a cooling fan is provided at the rear to cool the coolant through operation of the cooling fan and heat-exchange with the outside air.

This electrical component cooling apparatus 110 may circulate the coolant in the coolant line 111 through operation of the first water pump 114 to cool at least one electrical component 116.

Here, the electrical component 116 may include any one of a drive motor, a power control apparatus, an inverter, a charger (On Board Charger, OBC), a controller, or an autonomous driving controller.

The drive motor, the power control apparatus, the inverter, the controller, and the autonomous driving controller may be configured to generate heat while driving, and the charger may generate heat when charging the battery module 122.

The electrical component cooling apparatus 110 configured in the instant way circulates the coolant cooled by the radiator 112 through operation of the first water pump 114 along the coolant line 111, so that the electrical component 116 is not overheated.

In an exemplary embodiment of the present disclosure, the battery cooling apparatus 120 may include a battery coolant line 121 connected to the valve 102, and the battery module 122 and a second water pump 124 provided in the battery coolant line 121.

The battery cooling apparatus 120 configured in the instant way may control the temperature of the battery module 122 by circulating the coolant in the battery module 122 through operation of the second water pump 124.

In an exemplary embodiment of the present disclosure, the internal heating apparatus 140 may include a first connection line 141 connected to the valve 102 to heat the vehicle interior by use of a coolant of a high temperature, and a third water pump 142 and a heater 144 provided in the first connection line 141.

The internal heating apparatus 140 configured in the instant way may selectively open the first connection line 141 through operation of the valve 102 so that the coolant of a high temperature is supplied to the heater 144 when heating the vehicle interior.

Accordingly, the coolant of a high temperature may be supplied to the heater 144 along the first connection line 141.

That is, the internal heating apparatus 140 may heat the vehicle interior by supplying the coolant of a high temperature to the heater 144 through operation of the third water pump 142 in the vehicle heating mode.

Meanwhile, the heater 144 may be provided inside the Heating, Ventilation, and Air Conditioning (HVAC) module: 180.

Here, the first connection line 141 between the valve 102 and the third water pump 142 may be provided with a coolant heater 146 for selectively heating the coolant circulating in the first connection line 141.

The coolant heater 146 operates to be turned on when the temperature of the coolant supplied to the heater 144 in the heating mode of the vehicle is lower than a target temperature to heat the coolant circulated in the first connection line 141, inflowing the coolant whose the temperature has risen into the heater 144.

Also, the coolant heater 146 may be operated selectively when the temperature of the battery module 122 is raised.

The coolant heater 146 may be an electric heater that operates according to a power supply.

Meanwhile, in an exemplary embodiment of the present disclosure, it is described that the coolant heater 146 is provided in the first connection line 141 as an exemplary embodiment of the present disclosure, but it is not limited thereto, and instead of the coolant heater 146, an air heater to increase the temperature of the outside air flowing into the interior of the vehicle may be applied.

The air heater may be provided at the rear of the heater 144 from the inside of the HVAC module 180 toward the interior of the vehicle to selectively heat the outside air passing through the heater 144.

The internal heating apparatus 140 configured in the instant way may heat the vehicle interior by supplying the coolant of a high temperature to the heater 144 through operation of the third water pump 142 in the heating mode of the vehicle.

On the other hand, the battery coolant line 121 may be selectively connectable through the first connection line 141 and the battery coolant connection line 126.

Accordingly, when the coolant heater 146 is operated, some of the coolant whose temperature has increased in the coolant heater 146 may be supplied to the battery coolant line 121 through the battery coolant connection line 126.

In an exemplary embodiment of the present disclosure, the internal cooling device 170 may include a fourth water pump 172 and a cooler 174 interconnected through a second connection line 171 to cool the vehicle interior by use of the coolant of a low temperature.

The second connection line 171 may be connected to an evaporator 156 provided in the centralized energy device 150.

The internal cooling device 170 configured in the instant way supplies the coolant whose the temperature has decreased while circulating in the second connection line 171 in the cooling mode of the vehicle to the cooler 174 through operation of the fourth water pump 172, cooling the vehicle interior.

Here, the cooler 174 may be provided inside the HVAC module 180.

On the other hand, the HVAC module 180 may include an opening/closing door 182 provided between the heater 144 and the cooler 174, and configured to control the outside air passing through the evaporator to be selectively introduced into the heater depending on cooling, heating, and dehumidifying modes of the vehicle therein.

That is, the opening/closing door 182 is opened so that the outside air passing through the cooler 174 in the heating mode of the vehicle inflows to the heater 144. Conversely, in the cooling mode of the vehicle, the opening/closing door 182 closes the heater 144 side so that the outside air cooled while passing through the cooler 174 flows directly into the vehicle.

In an exemplary embodiment of the present disclosure, the centralized energy device 150 (hereinafter referred to as a CE device) may be respectively connected to the internal heating apparatus 140 and the second connection line 171 through the valve so that the coolant of a high temperature is supplied to the internal heating apparatus 140 and the coolant of a low temperature is supplied to the internal cooling device 170.

This CE device 150 may heat-exchange the thermal energy generated during the condensation and evaporation of the refrigerant circulating in the refrigerant line 151 with each supplied coolant.

The refrigerant may be an R152-a, R744, or R290 refrigerant of high performance.

That is, the coolant of a high temperature is supplied to the heater 144 through the first connection line 141, and the coolant of a low temperature is supplied to the cooler 174 through the second connection line 171.

Here, the CE device 150 includes a condenser 153, a first expansion valve 155, an evaporator 156, an accumulator 157, and a compressor 159, which are connected through the refrigerant line 151.

First, the condenser 153 is circulated with the refrigerant inside and is connected to the valve 102 through the condenser connection line 133.

That is, the condenser 153 may heat-exchange the coolant and the refrigerant inflowed from the valve 102 through the condenser connection line 133, condensing the refrigerant.

The first expansion valve 155 may be connected to the condenser 153 through the refrigerant line 151. The first expansion valve 155 receives the refrigerant passing through the condenser 153 to be expanded.

The evaporator 156 is connected to the first expansion valve 155 through the refrigerant line 151. The present evaporator 156 may be connected to the second connection line 171 to cool the coolant circulating in the second connection line 171 in the internal cooling device 170.

The evaporator 156 configured in the instant way may evaporate the refrigerant through heat-exchange of the refrigerant and the coolant and simultaneously lower the temperature of the coolant.

Here, the coolant circulating in the internal cooling device 170 may be supplied to the evaporator 156 along the second connection line 171 so that the evaporator 156 evaporates the refrigerant through heat-exchange with the coolant.

Accordingly, the evaporator 156 may cool the coolant circulating in the second connection line 171 with the refrigerant of a low temperature evaporated inside through heat-exchange in the cooling mode of the vehicle, and may supply the coolant of a low temperature to the cooler 174 through the second connection line 171.

Also, the compressor 159 is provided in the refrigerant line 151 between the evaporator 156 and the condenser 153. The present compressor 159 may compress the refrigerant in the gaseous state discharged from the evaporator 156 and supply the compressed refrigerant to the condenser 153.

On the other hand, the accumulator 157 is provided in the refrigerant line 151 between the evaporator 156 and the compressor 159.

This accumulator 157 improves the efficiency and durability of the compressor 159 by supplying only the gaseous refrigerant to the compressor 159.

Also, the chiller 160 is connected to the centralized energy device 150 through the refrigerant connection line 163 so that the refrigerant is selectively circulated.

The chiller 160 is connected to the valve 102 through the chiller connection line 161 and selectively heat-exchanges the inflowed coolant with the refrigerant to control the temperature of the coolant.

One end portion of the refrigerant connection line 163 may be connected to the refrigerant line 151 connecting the condenser 153 and the first expansion valve 155.

Also, the other end portion of the refrigerant connection line 163 may be connected to the refrigerant line 151 between the evaporator 156 and the accumulator 157.

Here, the refrigerant connection line 163 at the front of the chiller 160 may be provided with a second expansion valve 165 to control the flow of the refrigerant flowing into the chiller 160 and selectively expand the refrigerant.

The second expansion valve 165 may expand the refrigerant inflowed into the refrigerant connection line 163 to inflow into the chiller 160 when cooling the battery module 122 by use of the coolant which undergoes heat transfer with the refrigerant, or selectively recover waste heat from the electrical component 116 and the battery module 122.

This second expansion valve 165 expands the condensed refrigerant discharged from the condenser 153 to lower the temperature of the refrigerant and introduces the low-temperature refrigerant to the chiller 135 so that the temperature of the coolant passing through the inside of the chiller 135 may be further decreased.

That is, the chiller 160 may lower the temperature of the coolant passing through the inside of the chiller 160 by use of the supplied refrigerant of a low temperature when cooling the battery module 122 by use of the coolant heat-exchanged with the refrigerant.

Accordingly, the coolant of which the temperature is decreased while passing through the chiller 160 is introduced into the battery module 122 so that the battery module 122 may be more efficiently cooled.

On the other hand, when the dehumidification is required in the heating mode of the vehicle, the fourth water pump 172 provided in the internal cooling device 170 may be operated and the evaporator 156 may be supplied with the refrigerant expanded by operation of the first expansion valve 155.

As such, the cooler 174 is supplied with the coolant of a low temperature heat-exchanged with the refrigerant from the evaporator 156, so that the internal dehumidification may be performed.

In the CE device 150 configured in the present way, the condenser 153, the evaporator 156, and the chiller 160 may be a water-cooled heat-exchanger in which the coolant is inflowed.

Also, the first expansion valve 155 and the second expansion valve 165 may be electronic expansion valves that selectively expand the refrigerant while controlling the flow of the refrigerant.

On the other hand, in an exemplary embodiment of the present disclosure, the valve 102 may include first, second, third, fourth, fifth, sixth, seventh, eighth, ninth, tenth, eleventh, and twelfth ports P1, P2, P3, P4, P5, P6, P7, P8, P9, P10, P11, and P12.

First, the first port P1 may be connected to the coolant line 111 connected to the electrical component 116.

The second port P2 may be connected to one end portion of the condenser connection line 133 to supply the coolant to the condenser 153.

One end portion of the first connection line 141 may be connected to the third port P3.

One end portion of the battery coolant line 121 may be connected to the fourth port P4.

One end portion of the chiller connection line 161 may be connected to the fifth port P5 to supply the coolant to the chiller 160.

The sixth port P6 may be connected to one end portion of the chiller connection line 133 to inflow the coolant discharged from the chiller 160.

The seventh port P7 may be connected to the other end portion of the battery coolant line 121.

The eighth port P8 may be connected to the other end portion of the battery coolant line 121.

The bypass line 117 connected to the radiator 112 may be connected to the ninth port P9.

Here, the bypass line 117 may be selectively opened through operation of the valve 102 when the temperature of the coolant is increased by absorbing the waste heat generated by the electrical component 116.

The tenth port P10 may be connected to the other end portion of the condenser connection line 133 so that the coolant passing through the condenser 153 inflows to the valve 102.

The eleventh port P11 may be connected to the radiator connection line 118 that connects the valve 102 and the radiator 112 separately from the coolant line 111 and the bypass line 117.

Also, the twelfth port P12 may be connected to the first connection line 141 connected to the third water pump 142.

That is, the valve 102 configured in the instant way may be a 12-way valve.

Hereinafter, the operation and action of the heat pump system for the vehicle according to various exemplary embodiments of the present disclosure configured as described above is described with reference to FIG. 2, FIG. 3 and FIG. 4 in detail.

First, in the heat pump system for the vehicle according to various exemplary embodiments of the present disclosure, the operation during the cooling of the battery module according to the cooling mode of the vehicle is described with reference to FIG. 2.

Figure 2:
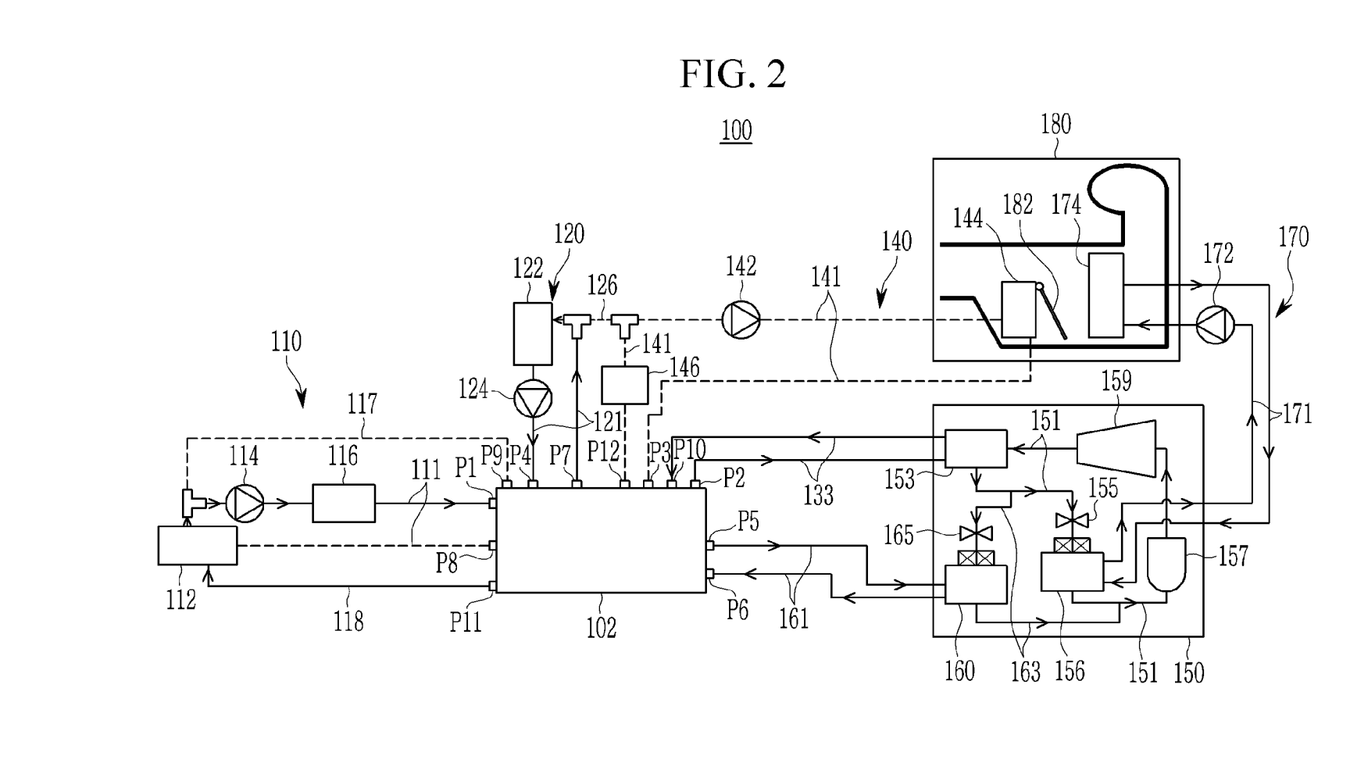
FIG. 2 is an operation state diagram during battery module cooling according to a cooling mode in a heat pump system for a vehicle according to various exemplary embodiments of the present disclosure.

FIG. 2 is an operation state diagram during battery module cooling according to a cooling mode in a heat pump system for a vehicle according to various exemplary embodiments of the present disclosure.

Referring to FIG. 2, in the cooling mode of the vehicle, when cooling the battery module 122, the coolant is circulated in the coolant line 111 by operation of the first water pump 114 in the electrical component cooling apparatus 110.

Accordingly, the coolant flowing along the coolant line 111 inflows to the first port P1 and then discharges through the second port P2 to the condenser connection line 133 to be supplied to the condenser 153.

The coolant passing through the condenser 153 inflows to the valve 102 through the tenth port P10, and then inflows to the radiator 112 through the radiator connection line 118 connected to the eleventh port P11.

Accordingly, the coolant cooled by the radiator 112 may cool the electrical component 116 and heat-exchange with the refrigerant supplied to the condenser 153.

Also, in the battery cooling apparatus 120, the coolant is circulated in the battery coolant line 121 by operation of the second water pump 124.

As such, the coolant inflowing from the valve 102 to the battery coolant line 121 connected to the seventh port P7 passes through the battery module 122 and then inflows to the valve 102 through the fourth port P4.

The coolant inflowed from the valve 102 to the chiller connection line 161 connected to the ninth port P9 passes through the chiller 160 and then inflows to the valve 102 along the chiller connection line 161 connected to the sixth port P6.

As such, the coolant inflowed to the valve 102 is again discharged to the seventh port P7 and circulated along the battery coolant line 121 and the chiller connection line 161.

Here, in the CE device 150, each constituent element may be operated so that the refrigerant circulates along the refrigerant line 151 to heat the vehicle interior.

At the present time, the first and second expansion valves 155 and 165 may expand the refrigerant that has passed through the condenser 153 to be supplied to the evaporator 156 and the chiller 160, respectively.

As such, the coolant supplied through the chiller connection line 161 is cooled through heat-exchange with the refrigerant of a low temperature supplied to the chiller 160. The cooled coolant may efficiently cool the battery module 122 while circulating along the battery coolant line 121 connected to the chiller connection line 161 through the valve 102.

On the other hand, in the internal cooling device 170, to supply the coolant passing through the evaporator 156 to the cooler 174, the fourth water pump 172 may be operated so that the coolant may be circulated along the second connection line 171 connecting the evaporator 156 and the cooler 174.

Here, the outside air inflowed to the HVAC module 180 is cooled while passing through the cooler 174 by the coolant of a low temperature inflowed to the cooler 174.

At the present time, the opening/closing door 182 closes the portion passing through the heater 144 so that the cooled outside air does not pass through the heater 144. Therefore, the cooled outside air may be directly inflowed into the interior of the vehicle.

Accordingly, the internal cooling device 170, in the cooling mode of the vehicle, may cool the vehicle interior by supplying the coolant of which the temperature decreases while circulating in the first connection line 171 to the cooler 174 through operation of the fourth water pump 72.

In an exemplary embodiment of the present disclosure, the case of recovering heat from the external heat source and increasing the temperature of the battery module 122 during the heating mode of the vehicle is described with reference to FIG. 3.

Figure 3:
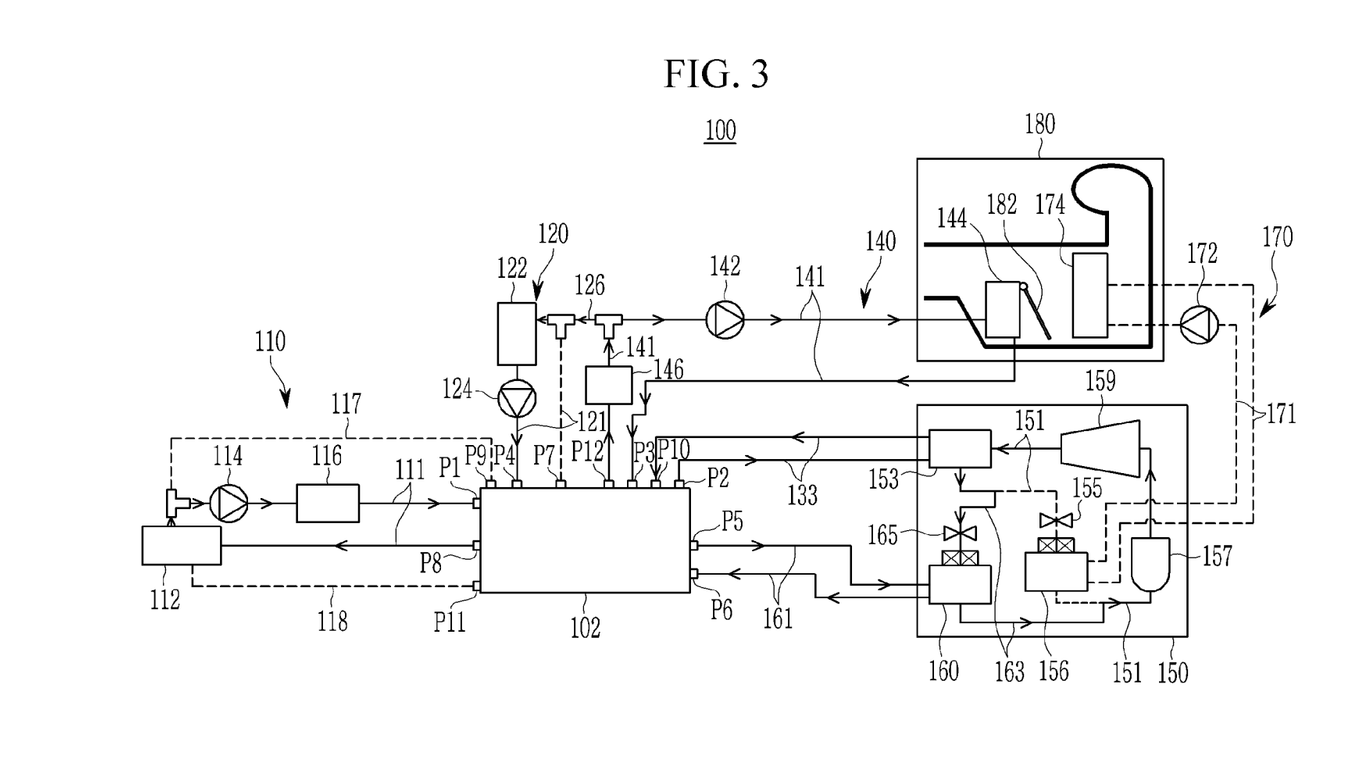
FIG. 3 is an operation state diagram for external heat source recovery and a battery module temperature increase according to a heating mode in a heat pump system for a vehicle according to various exemplary embodiments of the present disclosure.

FIG. 3 is an operation state diagram for external heat source recovery and battery module temperature increasing according to a heating mode in a heat pump system for a vehicle according to various exemplary embodiments of the present disclosure.

Referring to FIG. 4, the heat pump system 100 recovers heat from an external heat source in the heating mode of the vehicle to be used for the internal heating and increase the temperature of the battery module 122.

In an exemplary embodiment of the present disclosure, in the electrical component cooling apparatus 110 and the battery cooling apparatus 120, the first and second water pumps 114 and 124 are respectively operated.

Furthermore, in the internal heating apparatus 140, the third water pump 142 is operated.

First, the coolant flowing along the coolant line 111 inflows to the first port P1 and then is discharged from the valve 102 to the chiller connection line 161 through the ninth port P9.

The coolant discharged to the chiller connection line 161 passes through the chiller 160 along the chiller connection line 161 and then flows into the valve 102 through the sixth port P6.

The coolant inflowed to the valve 102 is discharged to the coolant line 111 connected to the radiator 112 through the eighth port P8. The coolant inflowed to the radiator 112 may recover heat from the external heat source through heat-exchange with the outside air while passing through the radiator 112.

Meanwhile, the coolant exhausted from the valve 102 through the second port P2 is supplied to the condenser 153 along the condenser connection line 161.

The coolant passing through the condenser 153 inflows to the valve 102 through the tenth port P10. As such, the coolant inflowed to the valve 102 is supplied to the heater 144 along the first connection line 141 connected to the twelfth port P12.

Here, the coolant heater 146 may be operated to heat the coolant circulating in the first connection line 141 when the temperature of the coolant circulating along the first connection line 141 is lower than the target temperature.

On the other hand, the opening/closing door 182 is opened so that outside air inflowed to the HVAC module 180 and passing through the cooler 174 passes through the heater 144.

Accordingly, when the outside air inflowed from the outside thereof passes through the cooler 174 to which the coolant of low temperature is not supplied, it is inflowed in the uncooled room temperature state. The inflowed outside air is converted to a high temperature state while passing through the heater 144 and inflows into the vehicle interior, so that the heating of the vehicle interior may be realized.

That is, the heat pump system 100 according to the exemplary embodiment absorbs heat from the external heat source from the radiator 112 to be used for the vehicle interior heating, reducing power consumption of the compressor 59 and improving heating efficiency.

And the coolant that has passed through the heater 144 is inflowed to the valve 102 through the third port P3 connected to the first connection line 141.

On the other hand, among the coolant that flowed into the first connection line 141 connected to the twelfth port P12, some coolant may flow into the battery coolant line 121 along the battery coolant connection line 126 and circulate through the battery module 122, and then may be inflowed to the valve 102 through the fourth port P4.

While repeating the present operation, the coolant whose temperature has increased while passing through the heater 144 and the condenser 153 is inflowed into the battery module 122, so that the temperature of the battery module 122 may be increased.

Here, in the CE device 150, each constituent element may be operated so that the refrigerant circulates along the refrigerant line 151 to heat the vehicle interior.

At the present time, the first expansion valve 155 is not operated, and the second expansion valve 165 expands the refrigerant that has passed through the condenser 153 to be supplied to the chiller 160. Accordingly, the supply of the refrigerant to the evaporator 156 is stopped.

Here, if the dehumidification of the vehicle interior is required while the heating mode of the vehicle is being performed, the first expansion valve 155 is operated to supply the expanded refrigerant to the evaporator 156.

At the same time, the fourth water pump 172 is operated in the internal cooling device 170, and the coolant is circulated along the second connection line 171.

The coolant circulating along the second connection line 171 may be inflowed into the cooler 174 in the state of being cooled through heat-exchange with the refrigerant in the evaporator 156.

That is, the outside air inflowed to the HVAC module 180 is dehumidified while passing through the cooler 174 by the coolant of a low temperature inflowed to the cooler 174. As such, it is converted to a high temperature state while passing through the heater 144 and inflows into the vehicle interior, so that the interior of the vehicle may be heated and dehumidified.

Figure 4:
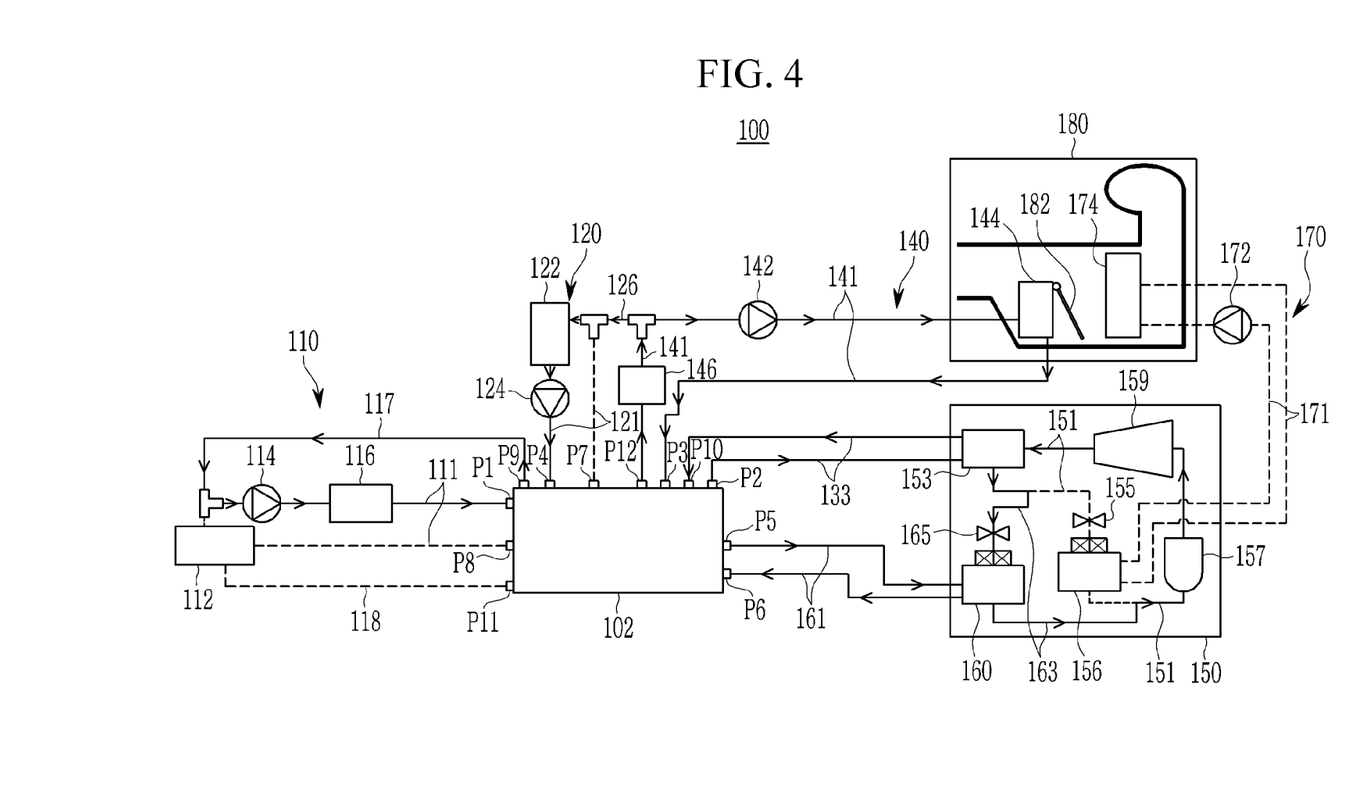
FIG. 4 is an operation state diagram for electrical component waste heat recovery and a battery module temperature increase according to a heating mode in a heat pump system for a vehicle according to various exemplary embodiments of the present disclosure.

In an exemplary embodiment of the present disclosure, during the heating mode of the vehicle, the operation for the case of recovering the waste heat of the electrical component 116 and increasing the temperature of the battery module 122 is described with reference to FIG. 5.

FIG. 4 is an operation state diagram for electrical component waste heat recovery and battery module temperature increasing according to a heating mode in a heat pump system for a vehicle according to various exemplary embodiments of the present disclosure.

Referring to FIG. 4, the heat pump system 100 may recover the waste heat of the electrical component 116 to be used for the internal heating and increase the temperature of the battery module 122 in the heating mode of the vehicle.

In an exemplary embodiment of the present disclosure, in the electrical component cooling apparatus 110 and the battery cooling apparatus 120, the first and second water pumps 114 and 124 are operated, respectively.

Furthermore, in the internal heating apparatus 140, the third water pump 142 is operated.

First, the coolant flowing along the coolant line 111 inflows to the first port P1 and then is discharged from the valve 102 to the chiller connection line 161 through the fifth port P5.

The coolant discharged to the chiller connection line 161 passes through the chiller 160 along the chiller connection line 161 and then flows into the valve 102 through the sixth port P6.

The coolant inflowed to the valve 102 is discharged to the bypass line 117 through the ninth port P9. While the coolant inflowed to the bypass line 117 passes through the electrical component 116 along the coolant line 111, the temperature may be increased by the waste heat of the electrical component 116.

That is, in the electrical component cooling apparatus 110, the coolant recovers the waste heat generated from the electrical component 116 and the temperature is increased while circulating through the coolant line 111, the chiller connection line 161, and the bypass line 117.

The coolant with the increased temperature may be supplied to the chiller 160 connected to the chiller connection line 161. Therefore, the waste heat generated by the electrical component 116 increases the temperature of the refrigerant supplied to the chiller 160.

That is, while repeatedly performing the present operation, the coolant absorbs the waste heat from the electrical component 116 and the temperature may be increased.

Also, the coolant whose temperature has risen by absorbing the waste heat from the electrical component 116 passes through the chiller 160 through operation of the first water pump 114 and is recovered while increasing the temperature of the refrigerant supplied to the chiller 160.

Accordingly, the chiller 160 may heat-exchange the coolant and the refrigerant to recover the waste heat from the coolant whose temperature has increased while passing through the electrical component 116, increasing the temperature of the refrigerant.

That is, the chiller 160 receives the refrigerant expanded through operation of the second expansion valve 165 through the refrigerant connection line 163 and evaporates the supplied refrigerant through heat-exchange with the coolant whose temperature has risen while passing the supplied refrigerant through the electrical component 116, the waste heat of the electrical component 116 may be recovered.

Meanwhile, the coolant exhausted from the valve 102 through the second port P2 is supplied to the condenser 153 along the condenser connection line 161.

The coolant that has passed the condenser 153 is inflowed to the valve 102 through the tenth port P10. As such, the coolant inflowed to the valve 102 is supplied to the heater 144 along the first connection line 141 connected to the twelfth port P12.

Here, the coolant heater 146 may be operated when the temperature of the coolant circulating along the first connection line 141 is lower than the target temperature to heat the coolant circulating in the first connection line 141.

On the other hand, the opening/closing door 182 is opened so that the outside air inflowed to the HVAC module 180 and passing through the cooler 174 passes through the heater 144.

Accordingly, when the outside air inflowed from the outside thereof passes through the cooler 174 to which the coolant of a low temperature is not supplied, it is inflowed in the uncooled room temperature state. The inflowed outside air is converted to a high temperature state while passing through the heater 144 and inflows into the vehicle interior, so that the heating of the vehicle interior may be realized.

That is, the heat pump system 100 according to the exemplary embodiment absorbs heat from the external heat source from the radiator 112 to be used for the vehicle interior heating, reducing power consumption of the compressor 59 and improving heating efficiency.

Also, the coolant that has passed through the heater 144 is inflowed to the valve 102 through the third port P3 connected to the first connection line 141.

On the other hand, among the coolant that flowed into the first connection line 141 connected to the twelfth port P12, some coolant may flow into the battery coolant line 121 along the battery coolant connection line 126 and circulate through the battery module 122, then be inflowed to the valve 102 through the fourth port P4.

While repeating the present operation, the coolant whose temperature has increased while passing through the heater 144 and the condenser 153 is inflowed into the battery module 122, so that the temperature of the battery module 122 may be increased.

Here, in the CE device 150, each constituent element may be operated so that the refrigerant circulates along the refrigerant line 151 to heat the vehicle interior.

At the present time, the first expansion valve 155 is not operated, and the second expansion valve 165 expands the refrigerant that has passed through the condenser 153 and supplies it to the chiller 160. Accordingly, the supply of the refrigerant to the evaporator 156 is stopped.

Here, if the dehumidification of the vehicle interior is required while the heating mode of the vehicle is being performed, the first expansion valve 155 is operated to supply the expanded refrigerant to the evaporator 156.

At the same time, the fourth water pump 172 is operated in the internal cooling device 170, and the coolant is circulated along the second connection line 171.

The coolant circulating along the second connection line 171 may be inflowed into the cooler 174 in the state of being cooled through heat-exchange with the refrigerant in the evaporator 156.

That is, the outside air inflowed to the HVAC module 180 is dehumidified while passing through the cooler 174 by the coolant of a low temperature inflowed to the cooler 174. As such, it is converted to a high temperature state while passing through the heater 144 and inflows into the vehicle interior, so that the interior of the vehicle may be heated and dehumidified.

Therefore, when applying the heat pump system for the vehicle 100 according to various exemplary embodiments of the present disclosure as described above, the system may be simplified by adjusting the temperature of the battery module 122 according to the vehicle mode by use of the chiller 160 where the coolant and the refrigerant are heat-exchanged in the electric vehicle.

Furthermore, the present disclosure may improve heating efficiency by selectively recovering the waste heat generated from an external heat source, the electrical component 116, or the battery module 122 in the heating mode of the vehicle to be used for internal heating.

Furthermore, the present disclosure implements various modes by use of one valve 102 that is configured to control the flow of the coolant, reducing a manufacturing cost and a weight, and improving space utilization through the simplification of the entire system.

Furthermore, the present disclosure enables optimal performance of the battery module 122 by efficiently controlling the temperature of the battery module 122, and the overall travel distance of the vehicle may be increased through efficient management of the battery module 122.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heat pump system for a vehicle, the heat pump system comprising:
   a valve that is configured to control a flow of coolant inflowed inside;
   an electrical component cooling apparatus including a coolant line connected to the valve, and a radiator and a first pump provided in the coolant line and configured for circulating a coolant in the coolant line to cool at least one electrical component provided in the coolant line;
   a battery cooling apparatus including a battery coolant line connected to the valve, and a second pump and a battery module provided in the battery coolant line and configured for circulating a coolant to the battery module;
   an internal heating apparatus including a first connection line connected to the valve to heat the vehicle interior by use of high-temperature coolant, and a third pump and a heater provided in the first connection line;
   an internal cooling device including a fourth pump and a cooler interconnected through a second connection line to cool a vehicle interior by use of a low-temperature coolant;
   a centralized energy (CE) device connected to the internal heating apparatus through the valve to supply a coolant of a high temperature to the internal heating apparatus and supply a coolant of a low temperature to the internal cooling device, connected to the second connection line, and configured for controlling a temperature of the coolant by heat-exchanging thermal energy generated during condensation and evaporation of refrigerant circulating in a refrigerant line with the coolant inflowed by operation of the valve; and
   a chiller connected to the centralized energy device through a refrigerant connection line so that the refrigerant is selectively circulated, connected to the valve through a chiller connection line, and heat-exchanging the selectively inflowed coolant with the refrigerant to control the temperature of the coolant,
   wherein the battery coolant line is selectively connectable to the first connection line through a battery coolant connection line connecting the battery coolant line and the first connection line, and
   wherein when dehumidification is required in a heating mode of the vehicle,
      the fourth pump provided in the internal cooling device is operated, and the refrigerant is supplied to an evaporator provided in the centralized energy device.

2. The heat pump system of claim 1, wherein the valve includes:
   a first port connected to the coolant line connected to the at least one electrical component;
   a second port connected to a first end portion of the condenser connection line to supply a coolant to the condenser provided in the centralized energy device;
   a third port to which a first end portion of the first connection line is connected;
   a fourth port to which a first end portion of the battery coolant line is connected;
   a fifth port to which a first end portion of the chiller connection line is connected to supply a coolant to the chiller; and a sixth port to which a second end portion of the chiller connection line is connected so that a coolant exhausted from the chiller flows in.

3. The heat pump system of claim 2, wherein the valve further includes:
a seventh port to which a second end portion of the battery coolant line is connected;
an eighth port to which the coolant line connected to the radiator is connected;
a ninth port to which a bypass line connected to the radiator by bypassing the at least one electrical component is connected;
a tenth port to which a second end portion of the condenser connection line is connected so that the coolant that has passed through the condenser inflows to the valve;
an eleventh port to which a radiator connection line connecting the valve and the radiator is connected separately from the coolant line and the bypass line; and
a twelfth port to which the first connection line connected to the third pump is connected.

4. The heat pump system of claim 3, wherein
when cooling the battery module in a cooling mode of the vehicle,
the coolant is circulated in the coolant line by operation of the first pump in the at least one electrical component cooling apparatus,
the coolant flowing along the coolant line inflows to the first port and then is discharged to the condenser connection line through the second port to be supplied to the condenser,
the coolant that has passed through the condenser inflows to the valve through the tenth port and then inflows to the radiator through the radiator connection line connected to the eleventh port,
the coolant is circulated in the battery coolant line by operation of the second pump in the battery cooling apparatus,
the coolant inflowed from the valve to the battery coolant line connected to the seventh port passes through the battery module and then inflows to the valve through the fourth port,
the coolant inflowed from the valve to the chiller connection line connected to the fifth port passes through the chiller, then inflows to the valve along the chiller connection line connected to the sixth port, and again is circulated along the battery coolant line and the chiller connection line while being discharged to the seventh port,
each constituent element operates so that refrigerant circulates along the refrigerant line in the centralized energy device, and
the fourth pump is operated so that coolant is circuited along the second connection line that connects the evaporator and the cooler to supply the coolant passing through the evaporator provided in the centralized energy device to the cooler in the internal cooling device.

5. The heat pump system of claim 4, wherein
when recovering heat from an external heat source in the heating mode of the vehicle and increasing a temperature of the battery module,
the first and second water pumps are operated, respectively, in the at least one electrical component cooling apparatus and the battery cooling apparatus,
the third pump is operated in the internal heating apparatus,
the coolant flowing along the coolant line flows into the first port and then is discharged from the valve through the fifth port to the chiller connection line,
the coolant discharged to the chiller connection line passes through the chiller along the chiller connection line and then flows into the valve through the sixth port,
the coolant inflowed to the valve is discharged to the coolant line connected to the radiator through the eighth port and recovers heat from the external heat source from outside air while passing through the radiator,
the coolant exhausted from the valve through the second port is supplied to the condenser along the condenser connection line,
the coolant that has passed through the condenser inflows to the valve through the tenth port and then is supplied to the heater along the first connection line connected to the twelfth port,
the coolant that has passed through the heater inflows to the valve through the third port connected to the first connection line,
some of the coolant inflowed to the first connection line connected to the twelfth port flows to the battery coolant line along the battery coolant connection line, circulates through the battery module, and then inflows to the valve through the fourth port, and
each constituent element operates so that refrigerant circulates along the refrigerant line in the centralized energy device.

6. The heat pump system of claim 4, wherein
when recovering waste heat of the at least one electrical component in the heating mode of the vehicle and increasing a temperature of the battery module,
the first and second water pumps are operated, respectively, in the at least one electrical component cooling apparatus and the battery cooling apparatus,
the third pump is operated in the internal heating apparatus,
the coolant flowing along the coolant line flows into the first port and then is discharged from the valve through the fifth port to the chiller connection line,
the coolant discharged to the chiller connection line passes through the chiller along the chiller connection line and then flows into the valve through the sixth port,
the coolant inflowed to the valve is discharged to the bypass line through the ninth port,
the coolant inflowed to the bypass line passes through the at least one electrical component along the coolant line and the temperature thereof rises by the waste heat of the at least one electrical component,
the coolant exhausted from the valve through the second port is supplied to the condenser along the condenser connection line,
the coolant that has passed through the condenser inflows to the valve through the tenth port and then is supplied to the heater along the first connection line connected to the twelfth port,
the coolant that has passed through the heater inflows to the valve through the third port connected to the first connection line,
some of the coolant inflowed to the first connection line connected to the twelfth port flows to the battery coolant line along the battery coolant connection line, circulates through the battery module, and then inflows to the valve through the fourth port, and each constituent element operates so that refrigerant circulates along the refrigerant line in the centralized energy device.

7. The heat pump system of claim 6, wherein the chiller increases a temperature of the refrigerant by heat-exchanging the coolant and the refrigerant to recover waste heat from coolant whose temperature has risen while passing through the at least one electrical component.

8. The heat pump system of claim 1, wherein the centralized energy device includes:
a condenser that condenses the refrigerant through heat-exchange of the refrigerant and the coolant;
a first expansion valve connected to the condenser through the refrigerant line;
the evaporator connected to the first expansion valve through the refrigerant line, connected to the second connection line, and evaporating the refrigerant through heat-exchange of the refrigerant and the coolant simultaneously and decreasing the temperature of the coolant;
a compressor provided on the refrigerant line between the evaporator and the condenser; and
an accumulator provided on the refrigerant line between the evaporator and the compressor,
wherein a first end portion of the refrigerant connection line is connected to the refrigerant line between the condenser and the first expansion valve, and
wherein a second end portion of the refrigerant connection line is connected to the refrigerant line between the evaporator and the accumulator.

9. The heat pump system of claim 8, wherein a second expansion valve is provided to control the flow of the refrigerant inflowing into the chiller and to selectively expand the refrigerant on the refrigerant connection line at front of the chiller.

10. The heat pump system of claim 9, wherein the second expansion valve expands the refrigerant inflowed into the refrigerant connection line to inflow into the chiller when cooling the battery module by use of the coolant heat-exchanged with the refrigerant, or selectively recovering waste heat from the at least one electrical component and the battery module.

11. The heat pump system of claim 9, wherein the first expansion valve and the second expansion valve are electronic expansion valves that selectively expand the refrigerant while controlling the flow of the refrigerant.

12. The heat pump system of claim 1, wherein the chiller recovers waste heat generated from the at least one electrical component or the battery module, or adjusts a temperature of the battery module according to a cooling mode of the vehicle, or the heating mode.

13. The heat pump system of claim 1, wherein the internal heating apparatus further includes a coolant heater provided in the first connection line between the valve and the third water pump.

14. The heat pump system of claim 13, wherein the coolant heater is operated when the temperature of the coolant supplied to the heater in the heating mode of the vehicle is lower than a target temperature, or when a temperature of the battery module is increased.

* * * * *